A. W. WOODWARD.
DEMOUNTABLE RIM.
APPLICATION FILED JULY 29, 1920.
1,375,435. Patented Apr. 19, 1921.
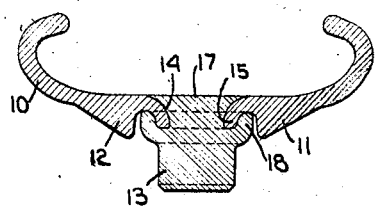
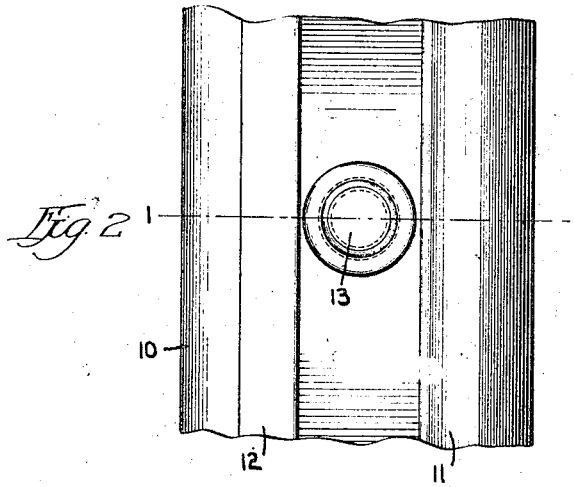
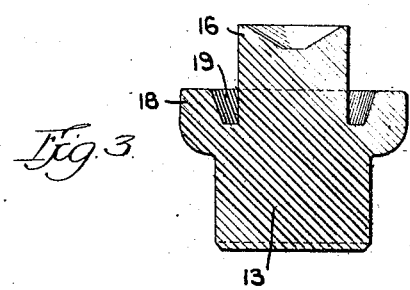
Inventor
A. W. Woodward,

UNITED STATES PATENT OFFICE.

ALVA W. WOODWARD, OF AKRON, OHIO, ASSIGNOR TO THE FIRESTONE STEEL PRODUCTS COMPANY, OF AKRON, OHIO, A CORPORATION OF OHIO.

DEMOUNTABLE RIM.

1,375,435.   Specification of Letters Patent.   Patented Apr. 19, 1921.

Application filed July 29, 1920. Serial No. 399,719.

*To all whom it may concern:*

Be it known that I, ALVA W. WOODWARD, a citizen of the United States, residing at Akron, in the county of Summit and State of Ohio, have invented certain new and useful Improvements in Demountable Rims, of which the following is a specification.

This invention relates to improvements in demountable rims for vehicle wheels, such as automobile wheels, and is particularly directed to the construction of the driving lug. This lug is generally attached to the demountable rim and is engaged by a projection on the felly or fixed rim of the wheel, the lug keeping the rim from slipping during the rotation of the wheel.

The object of the present invention is to provide a demountable rim with a driving lug which is easily attached in manufacture and one that is very durable and difficult to shear off.

The invention consists of the features of construction and combination of parts hereinafter fully described and claimed, reference being had to the accompanying drawings in which:

Figure 1 is a sectional view taken on line 1—1, Fig. 2.

Fig. 2 is a fragmentary plan view of the under side of a rim.

Fig. 3 is a detailed view of the driving lug in the process of manufacture.

In the drawings 10 represents a demountable rim which may be any of the well-known type now in use. I have illustrated a clencher type rim having two oppositely turned beveled ribs 11 and 12 intended to seat on the usual flanges formed on the fixed rim or felly of the wheel, not shown. Between these flanges 11 and 12 is located the driving lug 13 in an aperture 14. Aperture 14 is formed by a punch which leaves a downwardly extending flange 15, the aperture 14 being tapered.

Referring to Fig. 3, the driving lug 13 is constructed with a reduced portion, or shank 16, adapted to fit in the opening 14, the end of the shank being concaved to assist in forming a flat surface after it has been riveted into the rim to form a head 17. Also integral with the stud 13 is a circumferential flange 18 in which there is a depression 19 to receive the rib 15 when assembled.

In assembling, the driving lug 13 is placed in the opening 14 of the rim, the flange 18 fitting closely around the rib 15, and the end of the reduced portion 16 is riveted over, thus securely locking the lug to the rim.

The lug thus attached is very rigid, and in operation the strain is divided between the riveted head and the shoulder 15. The danger of shearing off the lug is practically eliminated and the life of the rim is lengthened.

The foregoing detailed description has been given for clearness of understanding only, and no unnecessary limitations should be construed therefrom.

I claim:

In a tire carrying rim, an aperture in said rim, an inwardly extending flange on said rim surrounding said aperture, and a driving lug secured in said aperture, being riveted over on the outer periphery of said rim, and having a circumferential flange to fit over said inwardly extending flange on the rim.

ALVA W. WOODWARD.